United States Patent [19]
Nukiyama

[11] Patent Number: 4,718,031
[45] Date of Patent: Jan. 5, 1988

[54] MULTIPLYING CIRCUIT

[75] Inventor: Tomoji Nukiyama, Tokyo, Japan

[73] Assignee: NEC Corporation, Tokyo, Japan

[21] Appl. No.: 697,652

[22] Filed: Feb. 4, 1985

[30] Foreign Application Priority Data

Feb. 2, 1984 [JP] Japan .................................. 59-17341

[51] Int. Cl.$^4$ .............................................. G06F 7/52
[52] U.S. Cl. ..................................... 364/754; 364/757
[58] Field of Search .......................... 364/754, 757–760

[56] References Cited

U.S. PATENT DOCUMENTS

| | | | |
|---|---|---|---|
| 3,508,038 | 4/1970 | Goldschmidt et al. | 364/757 |
| 4,031,377 | 6/1977 | Deutsch et al. | 364/757 |
| 4,546,446 | 10/1985 | Machida | 364/757 |
| 4,547,862 | 10/1985 | McIver et al. | 364/757 |

*Primary Examiner*—Gary V. Harkcom
*Assistant Examiner*—Long T. Nguyen
*Attorney, Agent, or Firm*—Sughrue, Mion, Zinn, Macpeak & Seas

[57] ABSTRACT

In a multiplying operation, a first partial product corresponding to multiplication of the multiplicand by even multipliers can be produced by a shifting operation, while a second partial product corresponding to multiplication of the multiplicand by odd multipliers is produced by a shifting operation and an adding operation. In the described multiplying circuit, the first partial product is produced according to the result of a decoding operation for generating signals designating the partial product to be used in the multiplying operation. On the other hand the second partial product is independently produced regardless of the decoding result when the multiplicand is received to the multiplying circuit. Thus, a high speed multiplying operation can be achieved.

4 Claims, 6 Drawing Figures

MULTIPLYING CIRCUIT

BACKGROUND OF THE INVENTION

1. Technical Field of the Invention

The present invention relates to a multiplying circuit suitable for an integrated circuit on a semiconductor chip and, more particularly, to a high-speed multiplying circuit using the Booth's algorithm.

2. Description of the Prior Art

Generally, a multiplicand X, a multiplier Y and the product P ($=X \cdot Y$) are defined by the following equations for the multiplication of 16 bits×16 bits:

$$X = \sum_{i=0}^{15} x_i \cdot 2^i \quad (1)$$

$$Y = \sum_{j=0}^{15} y_j \cdot 2^j \quad (2)$$

$$P = XY = \sum_{i=0}^{15} x_i \cdot 2^i \cdot \sum_{j=0}^{15} y_j \cdot 2^j = \sum_{ij} x_i \cdot y_j \cdot 2^{i+j} \quad (3)$$

Usually, in order to construct a hardware circuit for a parallel multiplication of n bits×n bits, there are required an $n^2$ number (e.g., 256 in the case of 16 bits) of logic blocks. Each block has an AND gate for generating partial product and a full adder for adding the partial products. Even if the "carry save adder (CSA)" system is adopted, the carry must be propagated through 2n (e.g., 32 in the case of 16 bits) blocks so that the speed of operation cannot be increased.

While, according to the multiplying circuit using the Booth's algorithm (as is disclosed in Japanese Patent Publication No. 57-1014), the operation speed becomes faster than that of the above-mentioned parallel multiplying circuit. In this circuit, the multiplier Y is divided into groups of three bits (of which one bit is overlapped between the preceding and succeeding groups), and each group is decoded by a decoder referring to a bit pattern of three bits. Thereafter any of partial products ±2X, ±X and 0 is produced in accordance with the decoded results for each group. A total sum is obtained by accumulating all of the produced partial products.

The Booth's algorithm is featured by the facts that the partial product producing means can be reduced, since the concept of 2's complement can be introduced into the partial products, and that no correction of a sign bit is required for the multiplications, as is well known in the art. According to the Booth's algorithm, since a plurality of bits of the multiplier are simultaneously decoded, high-speed multiplication can be obtained.

In a high-grade digital computation or a complex calculation, however, it is required to multiply data of long bit lengths by each other. Especially in a 16 or 32 bits microprocessor with a high-performance, it is predicted that higher-speed and more precise computations will be required. In order to satisfy these requirements, it is conceivable to increase the number of bits of the group to be decoded for reducing the number of partial product producing steps. For example, 4 or more bits of the multiplier may be decoded at the same time. In this case, however, if a group of 4 bits are decoded, it is necessary to generate partial products corresponding to ±4X, ±3X, ±2X, ±X and 0 for the multiplicand X in accordance with the decoded results of 4 bits. Table 1 shows the partial products in the 4-bit decoder (wherein: $y_{3i-2}$ to $y_{3i+1}$ designate 4-bit patterns of the multiplier to be decoded; and $P_p$ designates the partial products).

TABLE 1

| $y_{3i+1}$ | $y_{3i}$ | $y_{3i-1}$ | $y_{3i-2}$ | Pp | $y_{3i+1}$ | $y_{3i}$ | $y_{3i-1}$ | $y_{3i-2}$ | Pp |
|---|---|---|---|---|---|---|---|---|---|
| 0 | 0 | 0 | 0 | 0 | 1 | 0 | 0 | 0 | −4X |
| 0 | 0 | 0 | 1 | X | 1 | 0 | 0 | 1 | −3X |
| 0 | 0 | 1 | 0 | X | 1 | 0 | 1 | 0 | −3X |
| 0 | 0 | 1 | 1 | 2X | 1 | 0 | 1 | 1 | −2X |
| 0 | 1 | 0 | 0 | 2X | 1 | 1 | 0 | 0 | −2X |
| 0 | 1 | 0 | 1 | 3X | 1 | 1 | 0 | 1 | −X |
| 0 | 1 | 1 | 0 | 3X | 1 | 1 | 1 | 0 | −X |
| 0 | 1 | 1 | 1 | 4X | 1 | 1 | 1 | 1 | 0 |

Now, upon producing of the partial products ±4X, ±3X, ±2X, ±X and 0, respectively, the partial products ±4X and ±2X, i.e., even number multiplication of the multiplicand X can be generated easily by shifting the multiplicand X two bits and one bit, respectively, by means of shift operations. However, to produce the partial product ±3X, the multiplicand X has to be multiplied an odd number of times. This operation cannot be accomplished at high speed by the simple multiplying circuits proposed in the prior art. For a 4th-order Booth's algorithm, moreover, the partial products ±8X, ±7X, ---, ±X and 0 are required, but the partial products produced with an odd multiplier (±7X, ±5X and ±3X except ±X) cannot be easily produced. If it is possible, a long period of time must be spent to produce the partial products 7X, 5X and 3X. Further, even if the partial products 7X, 5X and 3X can be produced by a conventional multiplying circuit, since this production has to be performed after the decoding operation is terminated, a high-speed operation is very hard to achieve.

In addition, hardware elements for producing both the partial products of odd multipliers and even multipliers is required in each block for producing a partial product. Therefore, since the circuit pattern of each block becomes complex, the design of the multiplication circuit is very difficult. Moreover, it will be also difficult to integrate the circuit on a single semiconductor chip. Particularly, in an integrated circuit on a chip, it is important to align the same pattern in an array shape to make the LSI technology easy.

SUMMARY OF THE INVENTION

An object of the present invention is to provide a multiplying circuit which can execute multiplications at a high speed by a simple hardware circuit.

Another object of the present invention is to provide a multiplying circuit which can perform a multiplying operation in accordance with a decoding operation of 4 or more bits on the basis of the Booth's algorithm.

Still another object of the present invention is to provide a multiplying circuit which can be formed with a simple circuit pattern on a single semiconductor chip.

A multiplying circuit of the present invention comprises first input means receiving a multiplicand X composed of a plurality of bits, second input means receiving a multiplier Y composed of a plurality of bits, decoding means coupled to the second input means for decoding the multiplier Y and for generating at least a first signal designating a first partial product corresponding to the multiplication of the multiplicand X by an even multiplier and a second signal designating a second partial product corresponding to the multiplication of the multiplicand X by an odd multiplier according to the decoding operation, first means for producing the first partial product when said first signal is generated from the decoding means as the result of the decoding operation, second means for producing the second partial product regardless of the decoding operation, third means for selecting the produced second partial product according to the decoding result, and fourth means for producing a product by using the first partial product and the selected second partial product.

The most important feature of the present invention is the second means for producing the second partial product of an odd multiplier and the multiplicand X, for example 3X, 5X, or the like. The second means necessarily produces the second partial product according to the received multiplicand X regardless of the decoding operation. Namely, the second partial product is produced at the same time as the decoding operation is performed, and is only used when as the result of the decoding operation the decoding means generates the second signal designating the second partial product corresponding to the multiplication of the multiplicand X by an odd multiplier.

On the other hand, the production of the first partial product is started after the decoding operation is terminated. However, since the first partial product is easily obtained by a simple shifting operation, the first means can be constructed with a simple circuit element.

According to the present invention, first means for producing first partial products with even multipliers and second means for producing second partial products with odd multipliers are provided independently of each other, and specially the second partial products are produced at the same time when the decoding operation is performed or before the decoding operation is performed. As the result, it is possible to execute at a high speed the multiplying algorithm which requires the partial products of odd multipliers such as ±3X. Moreover, in the case where the second means is connected with the second input means of the multiplicand so that the data of odd multipliers are generated in advance in response to the input X, and whether those data are used or not is determined in accordance with the decoded results so that the multiplications can be executed in a hardware circuit without any aid of software, whereby it is possible to provide a very high-speed multiplier.

DESCRIPTION OF THE PREFERRED EMBODIMENT

First of all, the principle of the present invention will be described in the following.

The product P ($=X \cdot Y$) of the unsigned magnitude data (i.e., the multiplicand X and the multiplier Y) of the 16 bits is generally defined by the equations (1) to (3). As the method of shortening the critical path (the carry propagation path) to increase the operation speed, the system is provided, in which the multiplier Y is divided into a plurality of groups (e.g., m bits group), as described hereinbefore, and the partial products are produced for the corresponding group.

Now, when it is assumed that m=2, the partial products are 0, X, 2X and 3X. For m=3, 0, X, 2X, 3X, 4X, 5X, 6X and 7X are required as the partial products. Where 2X, 4X and 8X can be easily produced by shifting the multiplicand X in the left direction by 1, 2 and 3 bits, respectively, the 3X, 5X and 7X (in which the 6X is obtained by shifting the 3X by one bit) can not be easily produced by only the shifting operation. Certainly, by increasing in the value of in the number of the partial products to be produced can be decreased, but the kinds of the partial products to be required is increased. Therefore, the circuit for producing the partial product and the partial sum is complicated. Moreover, the regularity of the layout of LSI circuit pattern is lost.

On the other hand, if the representation of negative values (e.g., the modified two's complement form) is manipulated in the partial products, it is possible to reduce the kinds of the partial products to be necessitated, e.g., 0, ±X and ±2X for m=2, and 0, ±X, ±2X, ±3X and ±4X for m=3 (in the two's complement form, the negative value is easily obtained by inverting the respective bits and by adding 1 to the least significant bit (LSB) of the inverted bits).

Next, with respect of the number of full adders which are necessarily used in the multiplying circuit the following is to be considered. In the parallel multiplication system in which the multiplicand (16 bits) is multiplied by the multiplier (16 bits) without the decoding operation to produce partial products (e.g. AND operation is usually used), and in which these partial products are summed up by adders, full adders are required for the partial products of each bit except for the first LSB bit. As a result, 16×(16−1)=240 of full adders are required. In the carry save system, further, the adder for carry addition is required at the final stage so that the number of the full adders to be required becomes 16×[(16−1)+1]=256. On the other hand, in the Booth's algorithm, if 2 bits (m=2) of the multiplier are decoded at a time, four kinds of the partial products (0, 1X, 2X and 3X) are to be produced. Therefore, the number of the partial products becomes 18×(16/2−1). If the 3X is produced by 2X+X, moreover, the number of the partial products becomes 18×(16/2−1)+16=142 because adders of 16 bits are required. In the carry save adder system, moreover, the number of the partial products becomes 18×[(16/2−1)+1]16=160.

If the representation of negative value is employed in the partial product, the kinds of the partial products are 0, ±X and ±2X. Further, since the sign bit is added in the multiplier, the multiplication of 16 bits×17 bits are to be executed. Thus, 17×(17/2|$_{integer}$−1)+32=168 are required. Here, the value 32 indicates the CSA of the final stage. The result of the examinations for 3 bits (m=3) and for 4 bits (m=4) are shown in Table 2:

TABLE 2

Comparisons of Hardware
(in Number of Full Adders) of
Unsigned Magnitude Data of 16 × 16 bits

| | System | | | | | |
|---|---|---|---|---|---|---|
| | Unsigned Magnitude | | | Signed Magnitude | | |
| m | Summations of P.P. | Generations of P.P. | Total | Summations of P.P. | Generations of P.P. | Total |
| 1 | 240 (256) | 0 | 240 (256) | — | — | — |
| 2 | 126 (144) | 16 3X | 142* (160) | 168 | 0 | 168 |
| 3 | 95 (114) | 50 3X, 5X 7X | 145 (164) | 122 | 16 ±3X | 138** |
| 4 | 60 (80) | 96 3X, 5X, 7X, 11X, 13X, 15X | 156 (176) | 108 | 50 ±3X ±5X ±7X | 158 |

Where, parenthesized numerical values belong to the carry save adder system.

The above simulations are more or less different depending upon whether the method of generating the value 7X is made by 8X−X or by 4X+(2X+X). However, the table shows reasonable data in practical use.

As the result of the above examination, the quantity of hardware elements will be minimized in m=2 (*) in the unsigned magnitude. While, if the representation of negative value is allowed in the partial product, m=3 (**) will be best as shown in Table 2. Therefore, the partial product producing system of m=3 is effective. Despite this fact, however, it is necessary to sufficiently examine the hardware for correction of complement and the regularity of the circuit pattern in the layout.

Here, in order to represent the negative value by 2's complement, $x_{16}$ and $y_{16}$ are further added to the equations (1) and (2). Thus, the modified equations may be written as:

$$X = -x_{16} \cdot 2^{16} + \sum_{i=0}^{15} x_i \cdot 2^i \qquad (4)$$

where $x_{16}=0$ $$Y = -y_{16} \cdot 2^{16} + \sum_{i=0}^{15} y_i \cdot 2^i \qquad (5)$$

where $y_{16}=0$

The equation (5) is expanded as follows:

$$Y = -y_{16} \cdot 2^{16} + y_{15} \cdot 2^{15} + y_{14} \cdot 2^{14} + \ldots + y_2 \cdot 2^2 + y_1 \cdot 2^1 + y_0 \cdot 2^0$$
$$= -2^2 \cdot y_{16} \cdot 2^{16-2} + 2^1 y_{15} \cdot 2^{15-1} + y_{14} \cdot 2^{14} + (2y_{13} - y_{13}) \cdot 2^{13} + \ldots$$
$$= (-4y_{16} + 2y_{15} + y_{14} + y_{13}) \cdot 2^{14} - y_{13} \cdot 2^{13} + \ldots$$
$$= (-4y_{16} + 2y_{15} + y_{14} + y_{13}) \cdot 2^{14} + (-4y_{13} + 2y_{12} + y_{11} + y_{10}) \cdot 2^{11} + \ldots (-4y_4 + 2y_3 + y_2 + y_1) \cdot 2^2 + (-4y_1 + 2y_0 + y_{-1} + y_{-2}) \cdot 2^{-1}$$

$$= \sum_{i=0}^{5} 4y_{3i+1} + 2y_{3i} + y_{3i-1} + y_{3i-2} \cdot 2^{3i-1} \qquad (6)$$

(where $y_{-1} = y_{-2} = 0$)

$$= \sum_{j=0}^{5} B_j \cdot 2^{3j-1} \qquad (7)$$

As is apparent from (6) and (7), the value $B_j$ takes one of 0, ±1, ±2, ±3 and ±4 in dependence upon the bit pattern of the consective four bits (one of the four bits is overlapped with the adjacent bit pattern). The maximum 4X ($=X \cdot 2^2$) of the partial products is produced by a leftward shift of the mutliplicand X by 2 bits. Further, the multiplicand can be represented as follows, where the sign bit is expanded and the minus (negative) means inversion of each bit and addition of 1 to the LSB.

$$A = -a_{18} \cdot 2^{18} + \sum_{i=0}^{17} a_i \cdot 2^i + C_a \cdot 2^i \qquad (8)$$

Since the product P is determined as the summation of the partial products, the following equation (9) is obtained from the equations (7) and (8):

$$P = \left\{ -a_{18} \cdot 2^{18} + \sum_{i=0}^{17} a_i \cdot 2^i + C_a \cdot 2^i \right\} \left\{ \sum_{j=0}^{5} B_j \cdot 2^{3j-1} \right\} \qquad (9)$$

$$= -a_{18} \cdot 2^{18} \sum_{j=0}^{5} B_j \cdot 2^{3j-1} +$$

$$\sum_{j=0}^{5} \left\{ \sum_{i=0}^{17} a_i \cdot 2^i + C_a \cdot 2^i \right\} B_j \cdot 2^{3j-1}$$

$$= \sum_{j=0}^{5} (-P_j \cdot 2^{18}) \cdot 2^{3j-1} + \sum_{j=0}^{5} Q_j \cdot 2^{3j-1}$$

The righthand term of the equation (9) is determined by the array circuit which shifts the multiplicand A by a weight $2^{3j-1}$ according to the value B. Since the sign bit is expanded, in the lefthand term, $a_{18}=x_{16}$, and the following inequalities are obtained depending upon the value of $B_j$:

$$\begin{array}{ll} B_j > 0 & P_j \leftarrow x_{16} \\ B_j = 0 & P_j \leftarrow 0 \\ B_j < 0 & P_j \leftarrow \overline{x_{16}} \end{array} \qquad (10)$$

Thus, the partial product can be negative. If the 2's complement form is used in the negative representation, expansions of the sign bit is required for summations of j=0 to 5. Therefore, the sign portion will be expanded by making use of the characteristics of binary numbers, as follows:

$$\sum_{j=0}^{5} (-P_j \cdot 2^{18}) \cdot 2^{3j-1} = -P_5 \cdot 2^{18} \cdot 2^{14} - P_4 \cdot 2^{18} \cdot 2^{11} - \qquad (11)$$

$$P_3 \cdot 2^{18} \cdot 2^8 - P_2 \cdot 2^{18} \cdot 2^5 - P_1 \cdot 2^{18} \cdot 2^2 - P_0 \cdot 2^{18} \cdot 2^{-1}$$
$$= (-2^{33} + \overline{P_5} \cdot 2^{32} + 2^{32}) +$$
$$\quad (-2^{30} + \overline{P_4} \cdot 2^{29} + 2^{29}) + \ldots$$
$$= -2^{33} + \overline{P_5} \cdot 2^{32} + (2^{32} - 2^{30}) + \overline{P_4} \cdot 2^{29} + 2^{29} + \ldots$$
$$= -2^{33} + \overline{P_5} \cdot 2^{32} + 2^{31} + 2^{30} + \overline{P_4} \cdot$$
$$2^{29} + 2^{28} + 2^{27} + \overline{P_3} \cdot 2^{26} + 2^{25} + 2^{24} + \ldots + \overline{P_2} \cdot 2^{23} + 2^{22} + 2^{21} + \overline{P_1} \cdot 2^{20} + 2^{19} + 2^{18} + \overline{P_0} \cdot 2^{17} + 2^{17}$$

In the equation (11), the sign bit is not expanded to the 34th bit so long as the multiplication of $-1 \times -1$ is not executed in the multiplication of 17×17 bits. Since both the multiplier and the multiplicand are positive in this case from the conditions of the equations (4) and (5), the first term of $-2^{33}$ may be ignored.

On the other hand, although the operation speed, the number of elements and the power consumption are important factors in the design of the LSI circuit, the regularity in the layout is also important.

Therefore, in the present invention, the production of the partial products corresponding to multiplication (except for one) of the multiplicand by odd multipliers is separated from that of the partial product of even multipliers and the multiplicand. That is, in the case when 4 bits are decoded at a time, 3X is produced regardless of the decoding results.

For example, 3X may be produced, before 2X, 4X or the like is calculated, by the calculation (2X+X) whenever the multiplicand X is received in the multiplying circuit, or may be read out of a table memory in which the partial products corresponding to the multiplication of the multiplicand by odd multipliers are preliminarily prepared therein. Thus, the righthand term of (9) can be performed by the regular array circuit (shifting and adding).

Further, according to the present invention, with respect to the lefthand term of (9), the equation (11) is used. That is, since summation can be conducted at a suitable position by expanding the lefthand term of (9) as indicated in (11), the correction of the sign bit is unnecessary. Therefore, no expansion of the sign bit is required.

Moreover, in the case where the carry operation $(C_a \cdot 2^i)$ is performed at the time, when the partial product with the negative value is produced, the carry propagation speed becomes slow. Therefore, the summation of $C_a \cdot 2^i$ is performed at the final CSA portion. Here, for the multiplicand X=0, since the carry of +1 is propagated to the MSB (i.e., the sign bit) (In other words, the carry stops midway to exert no influence to the sign bit for X≠0), the value of the sign bit become different. This makes it necessary to detect X=0 to drop the output to zero.

As a result, according to the present invention a multiplying circuit can be constructed with the regular array pattern by means of: a generation circuit of 3X; an adder of 16 bits; a decoder of $B_{ja}$; a selector circuit at j=0; 18×5=90 arrays of unit circuits having a full adder and a selector of j=1 to 5; and a 32 bits adder of CSA at the final stage. Thus the multiplying circuit can be formed with 138 full adders and a code correcting circuit (which can be formed with little hardware as is expressed by the equation (11)). According to this construction, it is possible to provide a multiplying circuit which satisfies the regularity of the pattern layout in addition to the high speed operation and the small number of the elements.

Figure 1:
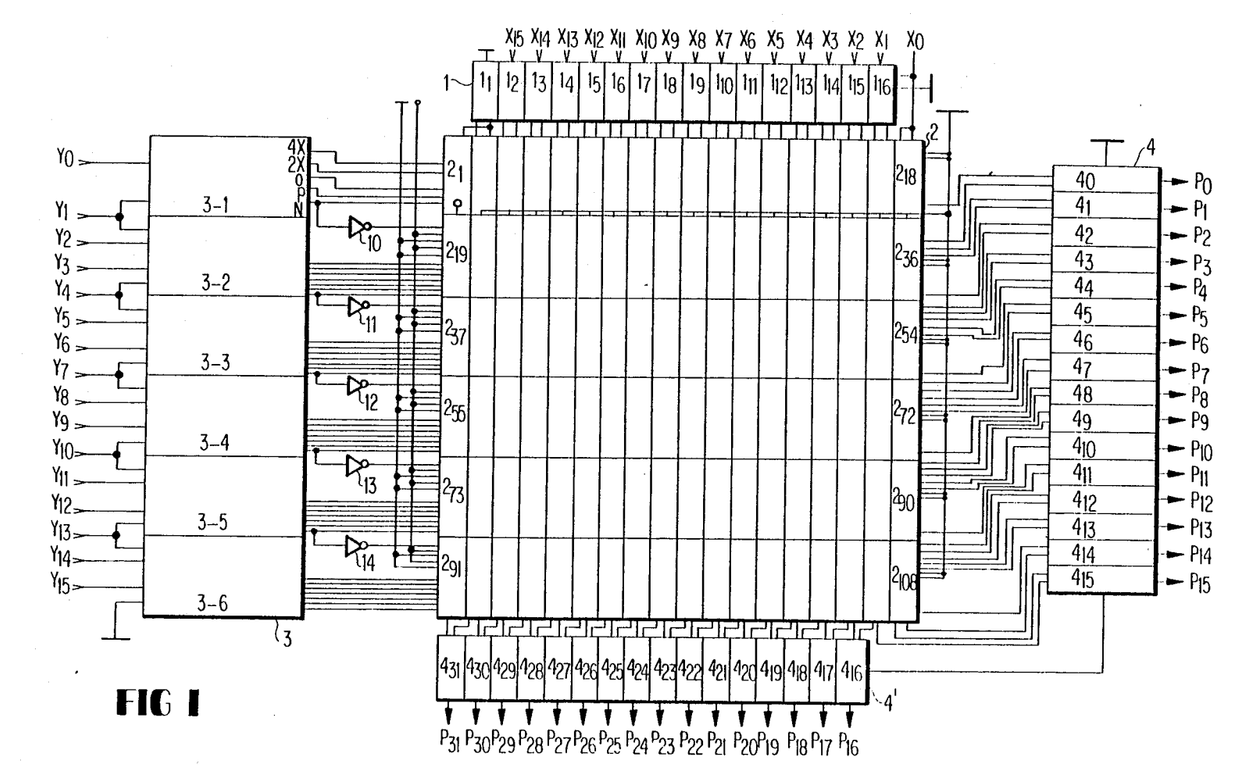
FIG. 1 is a block diagram of a multiplying circuit according to an embodiment of the present invention.
Figure 2:
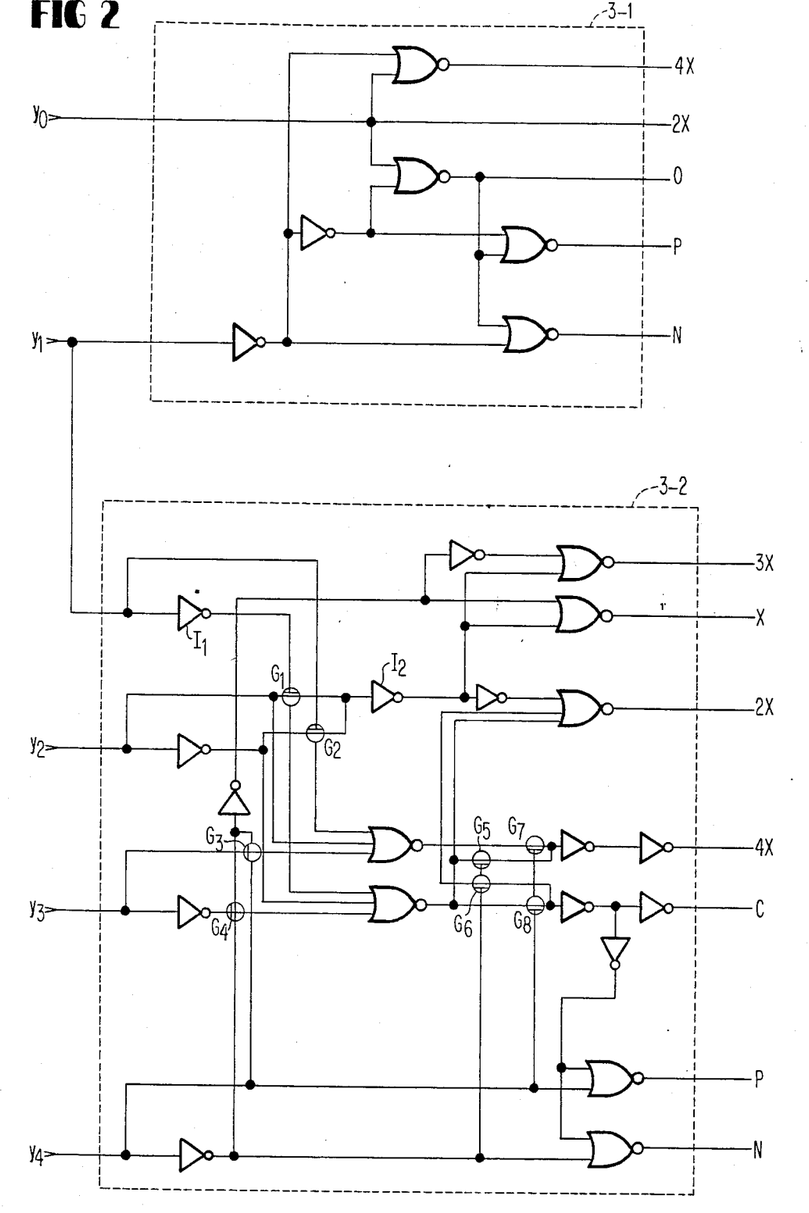
FIG. 2 is an example of a decoding circuit 3 in FIG. 1.

FIG. 1 is a circuit block diagram showing an embodiment of the present invention. There is shown an example of the multiplier for multiplying the multiplicand X ($x_0$ to $x_{15}$) of 16 bits and the multiplier Y ($y_0$ to $y_{15}$) of 16 bits. The circuit is constructed by applying an N-channel MOSIC technology. Incidentally, the operation is described in positive logic, but the negative logic is also acceptable. The multiplicand X is supplied to a 3X producing circuit 1 through input terminals ($x_0$ to $x_{15}$). On the other hand, the multiplier Y is received at input terminals ($y_0$ to $y_{15}$) and is divided into a plurality of bits (e.g., two bits $y_0$ and $y_1$ at the first stage of a decoder 3 and subsequently $y_1$-$y_4$, $y_4$-$y_7$, $y_7$-$y_{10}$, $y_{10}$-$y_{13}$ and $y_{13}$-$y_{15}$), which are simultaneously applied to the corresponding stages 3-2 to 3-6, respectively. A shift/selector circuit 2 has a plurality of logic circuits $2_1$–$2_{108}$ arranged in array shape. The logic circuits $2_{18}$, $2_{36}$..., $2_{108}$ at the right side are coupled to an adding circuit 4, while the logic circuits $2_1$, $2_{19}$, ..., $2_{91}$ at the botton side are coupled to an adding circuit 4'. The product of 32 bits (e.g., $P_0$ to $P_{15}$ and $P_{16}$ to $P_{31}$) are extracted from the adding circuits 4 and 4'. The 3X producing circuit 1 is composed of sixteen blocks $1_1$ to $1_{16}$ and executes 2X+X by its shift operation and adding operation. Wherein, the LSB ($x_0$) of the multiplicand X is directly transferred to the logic circuit $2_{18}$ in the shift/selector circuit 2. The block $1_1$ at the left side of the 3X producing circuit 1 receives a low level signal (ground level signal) at an input terminal. Each block has the same element. The first stage 3-1 and the second stage 3-2 of the decoder are shown in FIG. 2. The decoding operation is executed according to the four bits of the multiplier Y at a time as shown in table 3.

TABLE 3

| Values of Multiplier Groups | | | | Values of P.P. | Operations |
|---|---|---|---|---|---|
| $y_{3i+1}$ | $y_{3i}$ | $y_{3i-1}$ | $y_{3i-2}$ | | |
| 0 | 0 | 0 | 0 | 0 | Set partial product at 0 (or No operation). |
| 0 | 0 | 0 | 0 | X | Set P.P. at multiplicand. |
| 0 | 0 | 0 | 0 | X | Set P.P. at multiplicand. |
| 0 | 0 | 1 | 1 | 2X | Set P.P. at value of multiplicand shifted 1 bit to MSB. |
| 0 | 1 | 0 | 0 | 2X | Set P.P. at value of multiplicand shifted 1 bit to MSB. |
| 0 | 1 | 0 | 1 | 3X | Set P.P. at value of 3X prepared. |
| 0 | 1 | 1 | 0 | 3X | Set P.P. at value of 3X prepared. |
| 0 | 1 | 1 | 1 | 4X | Set P.P. at value of multiplicand shifted 2 bits to MSB. |
| 1 | 0 | 0 | 0 | −4X | Invert (or Add bit to) the values determined like plus values, and add "1" to LSB. |
| 1 | 0 | 0 | 1 | −3X | |
| 1 | 0 | 1 | 0 | −3X | |
| 1 | 0 | 1 | 1 | −2X | |
| 1 | 1 | 0 | 0 | −2X | |
| 1 | 1 | 0 | 1 | −X | |
| 1 | 1 | 1 | 0 | −X | |
| 1 | 1 | 1 | 1 | 0 | Set P.P. at 0. |

As shown in table 3, the decoder 3 generates six kinds of signals (0, X, 2X, 3X, 4X, P and N), where P and N mean the sign signals designating a positive value and a negative value, respectively. Further, since $y_{-1}$ and $y_{-2}$ are both "0", the $y_0$ and $Y_1$, the signals generated from the first stage 3-1 are only 0, ±2X and ±4X as shown in table 3. Therefore, by applying only $y_0$ and $y_1$ to the first stage 3-1 of the decoder 3, the circuit can be simplified. That is, in FIG. 2, when $y_0$ and $y_1$ are both "0", the signal 0 is generated, while when $y_0$ and $y_1$ are "0, 1", "1, 0" and "1, 1", the signals 2X, 4X and N, and 2X and N are generated, respectively. On the other hand, with respect to the remainder stages 3-2 to 3-6, four bits are applied thereto. Therefore, the same circuit 3-2 in FIG. 2 is used in each stage, in which transistor switching gates $G_1$ to $G_8$ are employed. For example, the transistor gate $G_1$ receives an output of an inverter $I_1$ at a gate electrode and its source (or drain) electrode is coupled to the $y_2$, while its drain (or source) electrode is coupled to an inverter $I_2$ and to a source (or drain) electrode of the transistor gate $G_2$. It will be noted that the sixth stage 3-6 receives $y_{13}$ to $y_{15}$ and a ground level signal the same as the block $1_1$ of the 3X producing circuit 1. Further, the signal N of each stage is directly applied to the corresponding block $2_1$, $2_{19}$, $2_{37}$, $2_{55}$, $2_{73}$ and $2_{91}$ and is inverted by inverters 10 to 14 to correct the sign bit. The inverted signals $\overline{N}$ are applied to the adjacent blocks $2_{19}$ to $2_{91}$, respectively.

Figure 3:
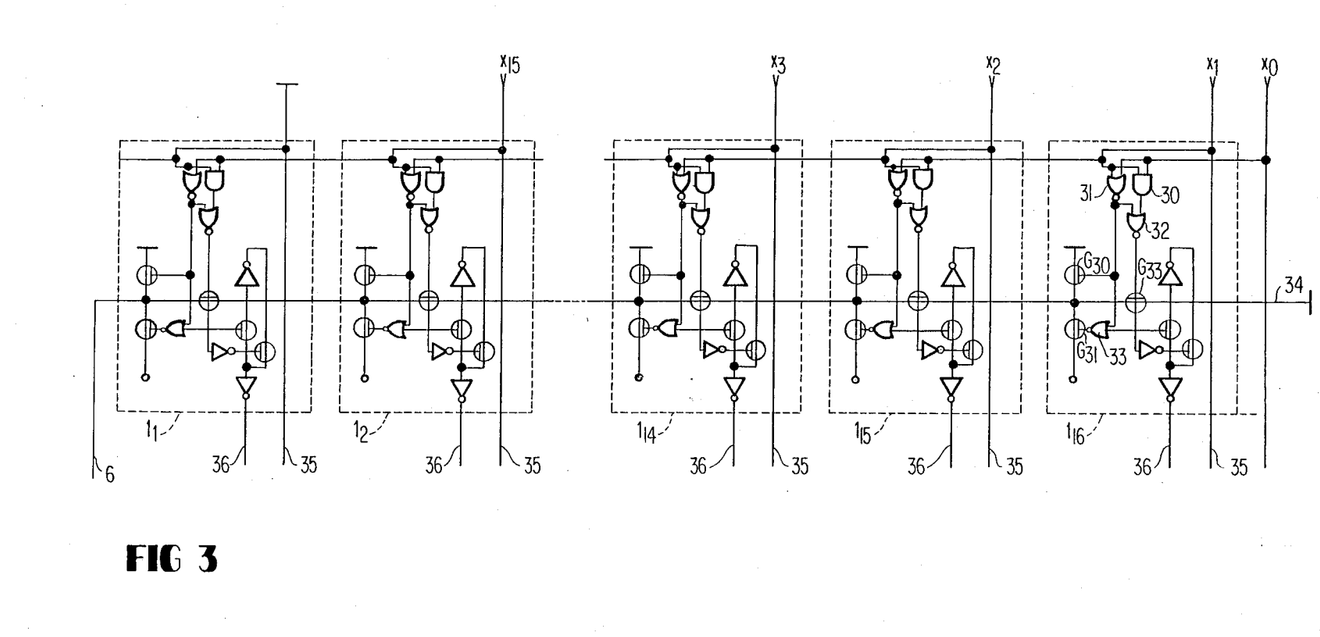
FIG. 3 is an example of a 3X producing circuit 1 in FIG. 1.

The 3X producing circuit 1 is shown in detail in FIG. 3 in which 16 blocks $1_1$ to $1_{16}$ have the same circuit pattern. Each block has an AND gate 30 and a NOR gate 31 which receives the corresponding bit and the bit of the previous bit. A NOR gate 32 receives outputs of the AND gate 30 and the NOR gate 31 and generates a control signal for controlling a carry signal propagation. That is, the carry signal is propagated through a propagation line 34 which is extended through all blocks. The control signal is applied at a gate electrode of a switching transistor gate $G_{33}$. If $x_0$ and $x_1$ are all "0", the gate $G_{33}$ is turned off. Therefore, the carry signal is stopped, but the signal (a ground level) designating no carry generation is transferred to the adjacent block $1_{15}$ since the gate $G_{30}$ is turned on. However, if either $x_0$ or $x_1$ is "1", the gate $G_{33}$ is turned on, thereby the carry signal from the previous block is transferred to the adjacent block. Further, if $y_1$ and $y_0$ are all "1", the gate $G_{33}$ is turned off and the gate $G_{31}$ is turned on by an output "1" of NOR gate 33. Therefore, a carry signal generated by the block itself is transferred to the next block. As shown in FIG. 3, the AND gate 30 and the NOR gate 31 receive the signal from the previous bit which is equal to the shifted bit by one (that is, 2X). In other words, each block receives 2X and X and adds them to each other, thereby 3X is produced and is transferred to the shift/selector circuit 2 through line 36. On the other hand, the X is also directly transferred through line 35 to the shift/selector circuit 2.

Figure 4:
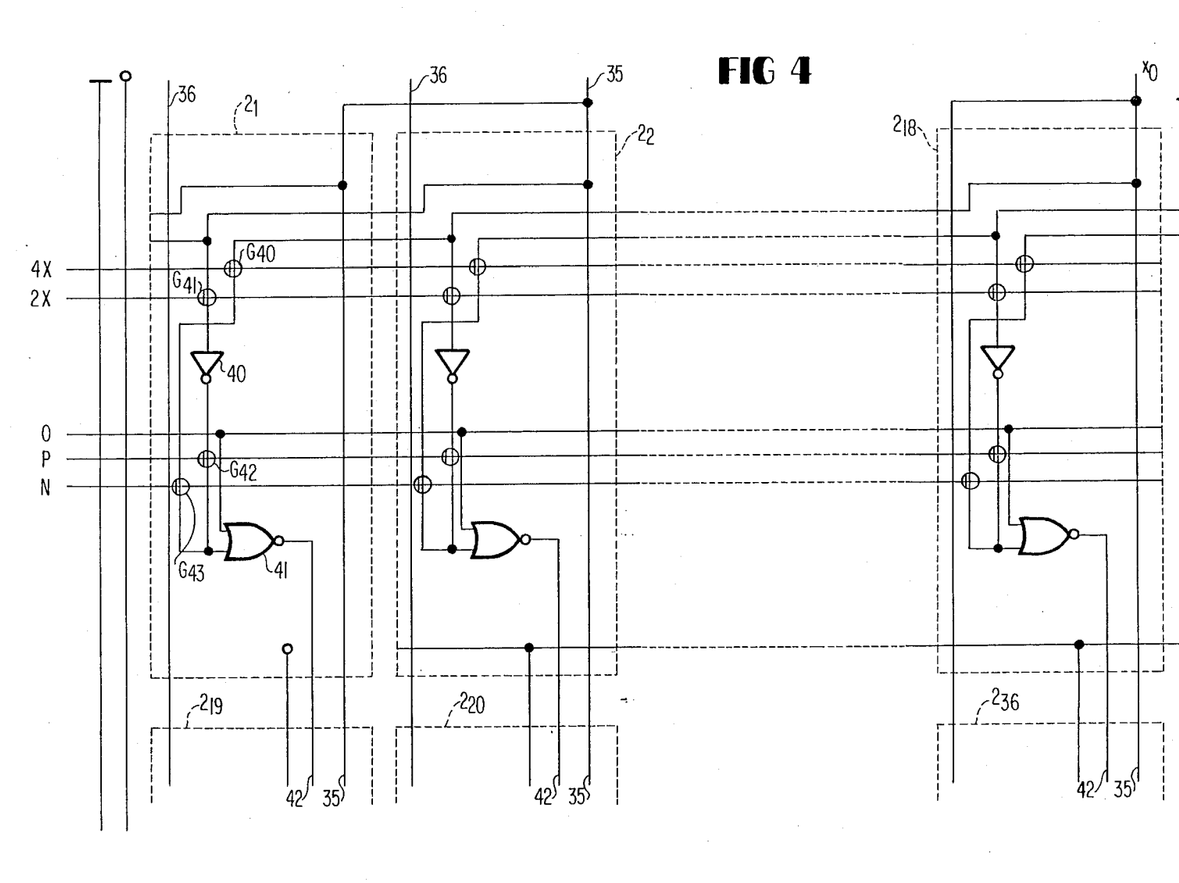
FIG. 4 is an example of a first group of a shift/selector circuit 2 in FIG. 1.
Figure 5:
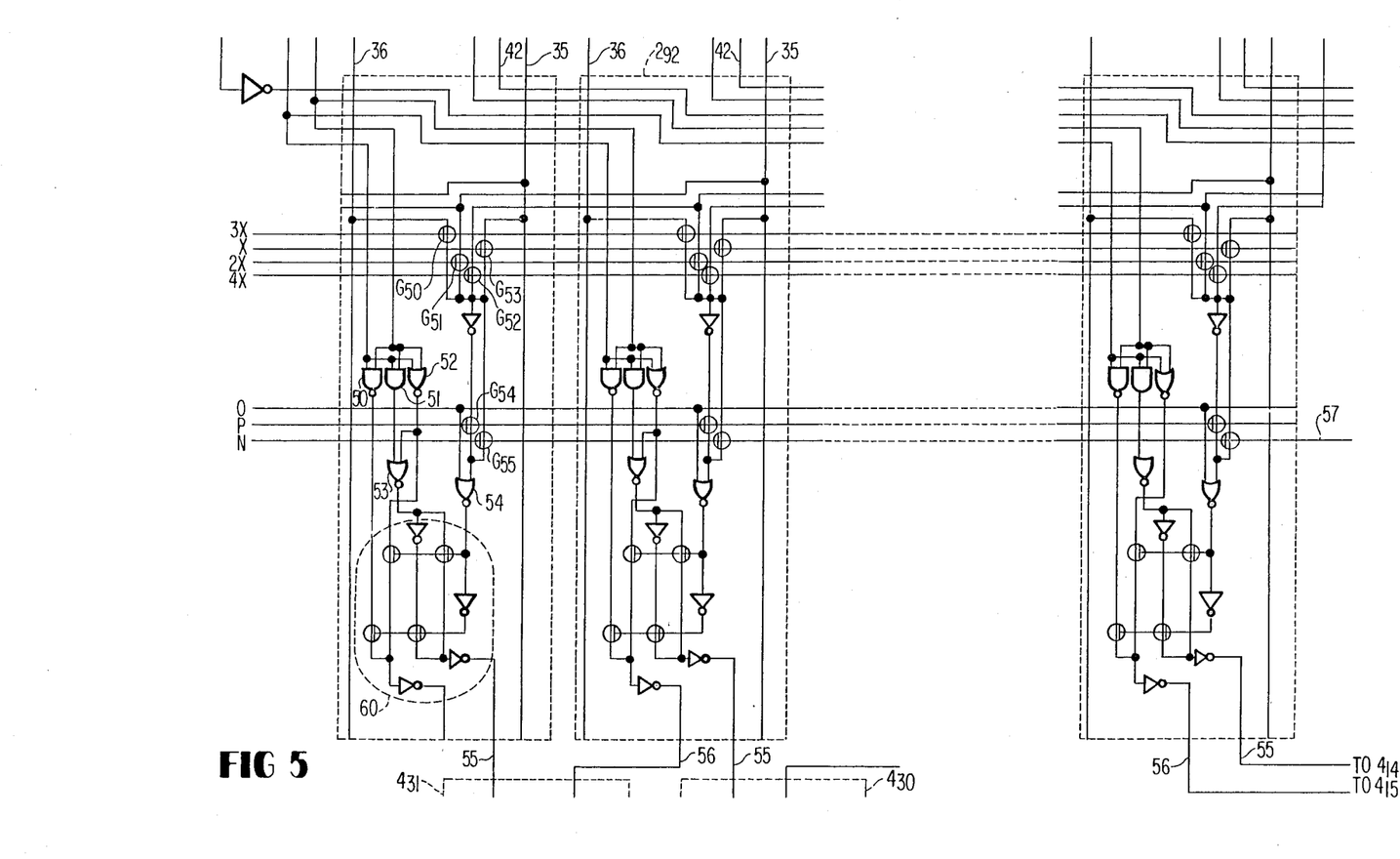
FIG. 5 is an example of a second group of the shift/selector circuit 2 in FIG. 1.

The logic circuits $2_1$ to $2_{18}$ of the shift/selector circuit 2 are shown in FIG. 4. These circuits are different from the subsequent circuits $2_{19}$ to $2_{108}$ because the number of input signals from the decoder 3 is different from that of the circuits $2_{19}$ to $2_{108}$. The circuits $2_1$ to $2_{18}$ includes four switching transistor gates $G_{40}$ to $G_{43}$, an inverter 40 and a NOR gate 41, respectively. The gate $G_{40}$ is turned on in response to the signal 4X, as the result the multiplicand X shifted in the left direction by two bits, that is 4X is selected and is transferred to the NOR gate 41. While, when the signal 2X is generated from the decoder 3, the one bit shifted multiplicand X, that is, 2X is selected by the gate $G_{41}$. Further, the selected data is transferred through line 42 to the lower logic circuits shown in FIG. 5 with the multiplicand X. In FIG. 5, the logic circuits $2_{19}$ to $2_{90}$ are omitted. The logic circuits in FIG. 5 receive the signals X, 2X, 3X, 4X, 0, P and N from the decoder 3 for selecting the data 4X, 3X, 2X, X and 0 according to the decoding operation. The selecting operation is executed by four switching gate transistors $G_{50}$ and $G_{53}$. In the circuit, a NAND gate 50, an AND gate 51 and NOR gates 52, 53 and 54 act as a full adder, and two output 55 and 56 are produced. Further, the signal N is used as the sign bit 57.

Figure 6:
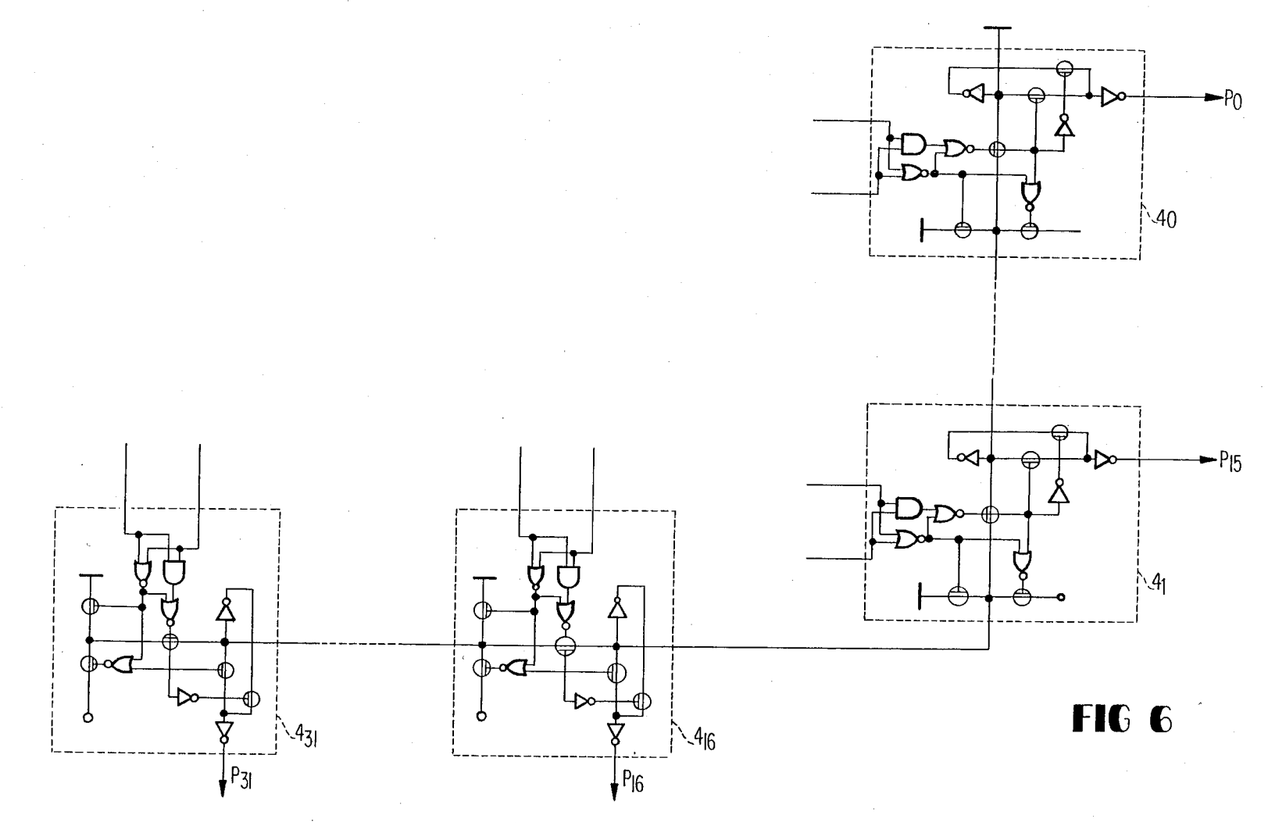
FIG. 6 is an example of adder circuits 4 and 4' in FIG. 1.

Adder circuits $4_0$ to $4_{31}$ are shown in FIG. 6, in which each circuit pattern may be the same as that of FIG. 3. The product (total sum) of 32 bits are obtained at the output terminals $P_0$ to $P_{31}$.

As described above, the shift/selector circuit 2 executes the shift operation to produce partial products according to the result of the decoding operation, but it has not the 3X producing circuit. That is, the circuit $2_1$ to $2_{18}$ has only a selector (40, $G_{40}$, $G_{41}$) and a zero-inversion control circuit ($G_{42}$, $G_{43}$ and 41). Moreover, the remaining circuits $2_{19}$ to $2_{108}$ connected with the decoders 3-2 to 3-6 are made to have the same construction as that of the circuit $2_{91}$, which is equipped with a shift/selector means ($G_{50}$ to $G_{53}$), a zero-inversion control means ($G_{54}$, $G_{55}$ and 54) and a full adder (50 to 53 and 60). This full adder executes the operation of inverting the value of 4X, 2X, X or 3X and to add 1 to the LSB, if these are negative (minus). Moreover, the decoder 3 and the shift/selector circuit 2 are connected through a compensation circuit based upon the equation (11).

In the present embodiment, the value 3X is generated in response to the input of the multiplicand X so that the two data X and 3X are supplied from the 3X generating circuit 1 to the shift/selector circuit 2. These data are selected and processed in accordance with the decoded results. The partial products thus generated are added in the final-stage adders 4 and 4' so that the products $P_0$ to $P_{31}$ of 32 bits are outputted.

As is apparent from the description thus far made, according to the present embodiment, the multiplier can be decoded in 4 bits at a time so that a high-speed multiplier can be provided. Moreover, the generations of the odd multipliers (3X) are conducted simultaneously with the input of the multiplicand, and the selections of the values 3X and X are conducted in accordance with the decoded results. As a result, the multiplications can be easily executed by a small quantity of the hardware. In place of the 3X generating circuit, incidentally, a table of a ROM or the like prepared with the data for odd multipliers of X for 3X or more may be used and referred to in accordance with the decoded results.

Moreover, it is possible to adopt either of the construction for repeating the processes of Table 3 or the construction equipped with all the hardware in parallel. Despite of this fact, however, the basic construction may be composed of: the 3X generator which is separated from the circuit 2, the shifter means for generating 2X and 4X for the multiplicand X in accordance with the results of decoding an arbitrary group of the multiplier Y; the selector for selecting one of the values 3X, 0, X, 2X and 4X; the inverter for inverting those values; the adder for adding the partial products thus generated; and the circuit for weighing in accordance with the multiplication groups (For example, a shift of each 3 bits is made to the MSB in the parallel system, whereas a shifter is required in the sequential system).

As shown in FIG. 1, moreover, the number of the bits of the shift/selector circuit is so expanded (to 18 bits) as to correspond to the maximum (i.e., 4X in this example) of the partial products so that the code bits are diffused in the computing process. As a result, the multiplier having its code bits overflowing requires a circuit for temporarily holding the overflowing bits, which can be eliminated from the present invention. Especially, the multiplier shown in FIG. 1 has other advantages to be enumerated in the following:

(1) The generation of 3X is deduced by adding the value 2X (which is prepared by shifting the value X by one bit to the MSB) and the value X by means of the total adder.

(2) The circuit does not contain any latch or register means but is constructed of a static combination circuit.

(3) The addition of the 32 bits of the final stage for deducing the products $P_0$ to $P_{31}$ resorts not to the CSA system but to the ripple through system (which is identical to the 3X circuit), which is easy to fabricate using MOS circuits.

(4) Since this example is applied to the absolute value of 16×16 bits, no correction of sign bits is required. Identical processings are also sufficient for the multiplicand $X=0000_H$.

Specifically, the present multiplier can be constructed of a reduced number of elements and can have its critical path (i.e., its longest carry transmission path) shortened.

What is claimed is:

1. A multiplying circuit comprising a first means receiving a multiplicand X, a second means coupled to said first means and producing 3X corresponding to three times said multiplicand X in response to the reception of said multiplicand X, a third means receiving a multiplier Y, a fourth means coupled to said third means and generating at least five signals by decoding said mulltiplier Y, a first signal designating zero, a second signal designating X, a third signal designating 2X, a fourth signal designating 3X, a fifth signal designating 4X, a fifth means coupled to said first and fourth means and producing data 0, X, 2X and 4X according to said first, second, third and fifth signals, a sixth means producing a total sum according to said data 0, X, 2X, 3X and 4X, and seventh means coupled to said second, fourth and sixth means for applying said data 3X to said sixth means when said fourth signal is generated from said fourth means.

2. A multiplying circuit as claimed in claim 1, in which said second means includes shifting means for shifting the received multiplicand X by 1 bit toward the most significant bit to produce 2X and adding means for adding the produced 2X to said received multiplicand X.

3. A multiplying circuit as claimed in claim 1, in which said fifth means includes means for outputting the data 0 when said first signal is generated, means for transferring the multiplicand X when said second signal is generated, means for shifting the multiplicand X by 1 bit towards the most significant bit side to produce the data 2X, and means for shifting the multiplicand X by 2 bits towards the most significant bit side.

4. A multiplying circuit comprising a first input means receiving a multiplicand composed of a plurality of bits, a second input means for receiving a multiplier composed of a plurality of bits, a decoding means coupled to said second input means for decoding said multiplier according to the Booth's algorithm to generate at least a first signal designating a first partial product of a multiplicand and an even number and a second signal designating a second partial product of a multiplicand and an odd number, a second partial product calculating means coupled to said first input means for calculating said second partial product in response to reception of said multiplicand, a first partial product calculating means coupled to said first input means and said decoding means for calculating said first partial product by use of the received multiplicand in response to said first signal generated by said decoding means, transferring means coupled to said second partial product calculating means and said decoding means for transferring said second partial product from said second partial product calculating means in response to said second signal generated from said decoding means, and adding means coupled to said first partial product calculating means and said transferring means for adding said first partial product to said second partial product.

* * * * *

UNITED STATES PATENT AND TRADEMARK OFFICE
CERTIFICATE OF CORRECTION

PATENT NO. : 4,718,031

DATED : January 5, 1988

INVENTOR(S) : NUKIYAMA

It is certified that error appears in the above-identified patent and that said Letters Patent is hereby corrected as shown below:

COLUMN 2, LINES 5 - 12    TABLE 1 Delete columns

| "$y_{3i-1}$ | $y_{3i-2}$ | $P_p$ |
|---|---|---|
| 0 | 0 | -4x |
| 0 | 1 | -3x |
| 0 | -3x | |
| 1 | 1 | -2x |
| 0 | 0 | -2x |
| 0 | 1 | -x |
| 1 | 0 | -x |
| 1 | 1 | 0" | and insert

| -- $y_{3i-1}$ | $y_{3i-2}$ | $P_p$ |
|---|---|---|
| 0 | 0 | -4x |
| 0 | 1 | -3x |
| 1 | 0 | -3x |
| 1 | 1 | -2x |
| 0 | 0 | -2x |
| 0 | 1 | -x |
| 1 | 0 | -x |
| 1 | 1 | 0-- |

COLUMN 4, LINE 59    Delete "18 x [(16/2-1) + 1]16 = 160" and insert
--18 x [(16/2 - 1) + 1] + 16 = 160--

UNITED STATES PATENT AND TRADEMARK OFFICE
CERTIFICATE OF CORRECTION

PATENT NO. : 4,718,031  Page 2 of 2

DATED : January 5, 1988

INVENTOR(S) : NUKIYAMA

It is certified that error appears in the above-identified patent and that said Letters Patent is hereby corrected as shown below:

COLUMN 10, LINE 26  Delete "for 3x or more" and insert

--( 3x or more )--

Signed and Sealed this

Twenty-third Day of August, 1988

Attest:

DONALD J. QUIGG

Attesting Officer  Commissioner of Patents and Trademarks